US011841288B2

(12) United States Patent
Tan

(10) Patent No.: US 11,841,288 B2
(45) Date of Patent: Dec. 12, 2023

(54) OPTICAL MEASUREMENT METHOD AND SYSTEM AND OPTICAL DEVICE MANUFACTURING SYSTEM

(71) Applicants: SHANGHAI INTELIGHT ELECTRONIC TECHNOLOGY CO., LTD., Shanghai (CN); JIANGSU INTELIGHT ELECTRONIC TECHNOLOGY CO., LTD., Suzhou (CN)

(72) Inventor: Shunyi Tan, Shanghai (CN)

(73) Assignees: SHANGHAI INTELIGHT ELECTRONIC TECHNOLOGY CO., LTD., Shanghai (CN); JIANGSU INTELIGHT ELECTRONIC TECHNOLOGY CO., LTD., Suzhou (CN)

(*) Notice: Subject to any disclaimer, the term of this patent is extended or adjusted under 35 U.S.C. 154(b) by 415 days.

(21) Appl. No.: 17/298,662

(22) PCT Filed: Mar. 21, 2019

(86) PCT No.: PCT/CN2019/079069
§ 371 (c)(1),
(2) Date: May 31, 2021

(87) PCT Pub. No.: WO2020/113855
PCT Pub. Date: Jun. 11, 2020

(65) Prior Publication Data
US 2022/0034751 A1    Feb. 3, 2022

(30) Foreign Application Priority Data
Dec. 3, 2018 (CN) .......................... 201811468152.9

(51) Int. Cl.
*G01M 11/02* (2006.01)

(52) U.S. Cl.
CPC .... *G01M 11/0257* (2013.01); *G01M 11/0207* (2013.01)

(58) Field of Classification Search
CPC ......... G01M 11/0257; G01M 11/0207; G01M 11/0264; G02B 27/62
See application file for complete search history.

(56) References Cited

U.S. PATENT DOCUMENTS 9,261,594 B2 *  2/2016  Bergeron ............ G01S 15/8904
9,594,245 B2 *  3/2017  Huang ............... G02B 27/0068
(Continued)

FOREIGN PATENT DOCUMENTS

CN    101644606 A    2/2010
CN    103412404 A    11/2013
(Continued)

*Primary Examiner* — Seung C Sohn
(74) *Attorney, Agent, or Firm* — Bayramoglu Law Offices LLC

(57) ABSTRACT

An optical measurement method and system and an optical device manufacturing system are provided. The optical measurement system includes an image generation system, an image measurement system and a control system. The image generation system is configured for generating test image information and outputting light containing the test image information to a device under test. The image measurement system is configured for obtaining detected image information according to the light passing through the device under test. The control system is configured for obtaining an aberration parameter according to imaging quality of the detected image information. The optical measurement method and system and an optical device manufacturing system can simulate any wavefront, and an assembled lens element can be simulated directly according to the compensation of an unassembled lens element to achieve a final imaging effect.

20 Claims, 1 Drawing Sheet

(56) References Cited

U.S. PATENT DOCUMENTS

| | | |
|---|---|---|
| 2004/0100629 A1 | 5/2004 | Stokowski et al. |
| 2009/0231593 A1 | 9/2009 | Freimann et al. |
| 2011/0026033 A1 | 2/2011 | Trolinger et al. |
| 2013/0092816 A1 | 4/2013 | Barrett et al. |
| 2015/0146196 A1 | 5/2015 | Huang |
| 2017/0089837 A1 | 3/2017 | Matsumoto et al. |

FOREIGN PATENT DOCUMENTS

| | | |
|---|---|---|
| CN | 105263396 A | 1/2016 |
| CN | 106289107 A | 1/2017 |
| CN | 106415354 A | 2/2017 |
| CN | 107525654 A | 12/2017 |
| CN | 108037594 A | 5/2018 |
| CN | 108061639 A | 5/2018 |
| CN | 108107579 A | 6/2018 |
| CN | 108152991 A | 6/2018 |
| CN | 108592820 A | 9/2018 |
| CN | 207976139 U | 10/2018 |
| WO | 2018138538 A1 | 8/2018 |

\* cited by examiner

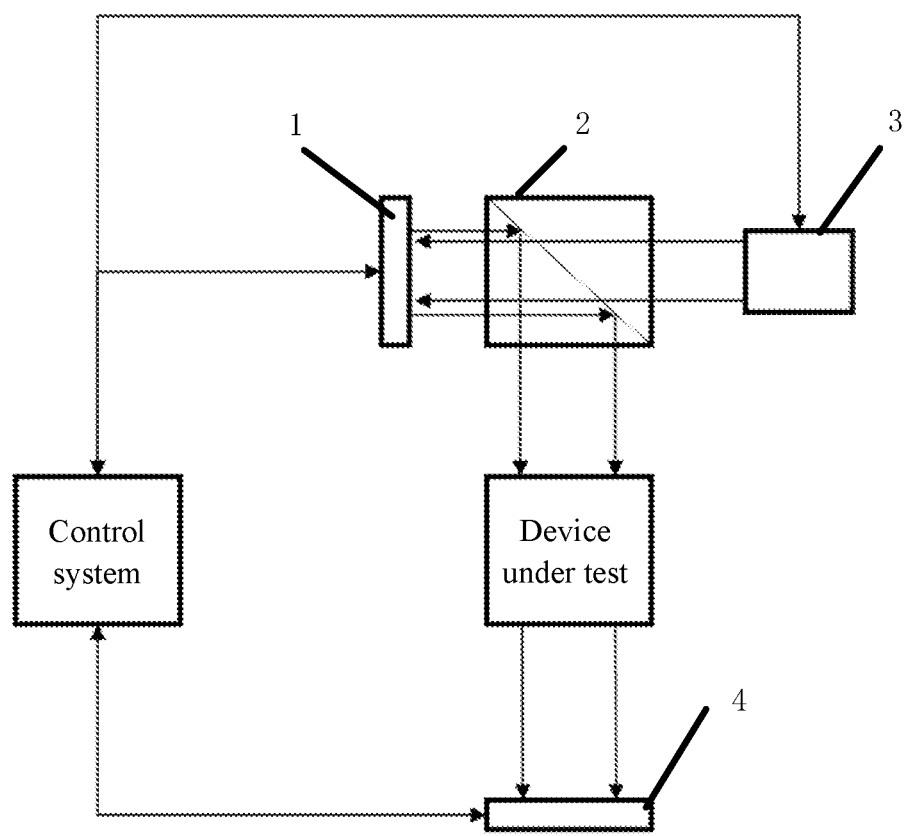

OPTICAL MEASUREMENT METHOD AND SYSTEM AND OPTICAL DEVICE MANUFACTURING SYSTEM

CROSS REFERENCE TO THE RELATED APPLICATIONS

This application is the national stage entry of International Application No. PCT/CN2019/079069, filed on Mar. 21, 2019, which is based upon and claims priority to Chinese Patent Application No. 201811468152.9, filed on Dec. 3, 2018, the entire contents of which are incorporated herein by reference.

TECHNICAL FIELD

The present invention relates to the field of optical measurement, in particular to an optical measurement method and system and an optical device manufacturing system.

BACKGROUND

According to a search of prior arts, the Chinese patent No. CN207976139U discloses an optical measurement device with a variable object distance for measure an optical device under test. In the optical measurement device, a displacement changing module of a variable object distance lens module is connected to lenses or image sensors of a telephoto lens module for adjusting inter-lens distances among the lenses, an image distance between the image sensor and the telephoto lens module or a combination of the inter-lens distances and the image distance. The optical measurement device in the prior art lie has defects as follows: the type for tested devices is in a minority and the universal application range is limited as the lens image module only can change the position of the object distance lens and cannot simulate a wavefront correspondingly.

SUMMARY

In order to overcome the defects in the prior art, the present invention provides an optical measurement method and system and an optical device manufacturing system.

The optical measurement system provided by the present invention includes:

an image generation system configured for generating test image information and outputting light containing the test image information to a device under test;

an image measurement system configured for obtaining detected image information according to the light passing through the device under test; and a control system configured for calculating and/or selecting the test image information and outputting the test image information to the image generation system.

Preferably, the control system obtains aberration parameters according to imaging quality of the detected image information.

Preferably, the control system includes:

a standard judging system configured for judging whether parameters measured meet a judging standard or not; outputting a measurement result if parameters measured meet the judging standard; and otherwise, obtaining a compensation parameter according to the current aberration parameter and adding the compensation parameter to the current test image information for compensation, wherein the image generation system generates compensated test image information.

Preferably, the test image information includes a hologram or a kinoform of a modulated wavefront.

Preferably, the test image information accounts for all or part of a target image height of the device under test; and/or the test image information accounts for all or part of a target field of view of the device under test.

Preferably, the image generation system separately generates the test image information that sets wavefront modulation, different parts corresponding to the target image height of the device under test and/or different parts of the target field of view; and the test image information is output for many times successively in form of different parameters and/or target objects.

Preferably, the image generation system includes at least one spatial light modulator.

Preferably, the plurality of spatial light modulators include phase spatial light modulators and/or intensity spatial light modulators.

Preferably, the spatial light modulator includes any one or more of a Liquid Crystal on Silicon, a Liquid Crystal Display (LCD), a Digital Mirror Device (DMD), an Organic Light Emitting Diode (OLED), a Micro-electro-mechanical Systems (MEMS) Scanner, an optical grating and an optical grating array.

Preferably, the Liquid Crystal on Silicon adopts phase modulation.

Preferably, the Liquid Crystal on Silicon adopts an Electrically Controlled Birefringence (ECB) or Vertically Aligned Nematic (VAN) mode.

Preferably, the image generation system includes any one or more of optical components: a light source, a lens, an optical stop, a rotator, a wave plate, a polarizer and a prism.

Preferably, the light source includes at least one or more wavelengths.

Preferably, the image measurement system includes any one or more of imaging devices: a Charge-coupled Device (CCD), a Complementary Metal Oxide Semiconductor (CMOS) and a film.

Preferably, the control system controls and synchronizes the image generation system and the image measurement system.

Preferably, the control system obtains the test image information by way of a real-time calculation or reading according to the input image and/or wavefront information, and outputs the test image information to the image generation system, wherein the image generation system generates the test image information physically to modulate a needed light wavefront and/or light field.

Preferably, the control system performs a real-time calculation or reading according to feedback of the image measurement system.

Preferably, the judging standard includes any one or more standards as follows:

a design specification of an optical lens;

count of measurement;

time during measurement; and tolerance.

Preferably, the measurement result includes any one or more parameters: Modulation Transfer Function (MTF) in a same field of view, MTFs in different fields of view, the aberration parameter, a chromatic aberration parameter and a focal length.

An optical measurement method provided by the present invention generates the test image information and adds wavefront compensation into the test image information.

Preferably, the wavefront compensation is configured for compensating an aberration existing in the device under test.

Preferably, the wavefront compensation is configured for compensating a missing part in the device under test.

Preferably, the wavefront compensation is implemented by obtaining a wavefront that is set to be propagated to the surface of the device under test, an exit/entrance pupil of the system or an optical stop position of the system and simulating the wavefront by using the image generation system.

Preferably, the wavefront is calculated by reversely propagating the wavefront of an image to the exit/entrance pupil of the system, the optical stop position of the system or the image generation system.

Preferably, the aberration includes any one or more of a spherical aberration, a coma, astigmatism, defocus, a chromatic aberration, curvature of field, a distortion and high order aberrations.

Preferably, the wavefront compensation is calculated by adopting a zernike polynomial and/or a seidal polynomial.

Preferably, propagation of the wavefront of the corresponding image is calculated by any one or more ways of Fourier transform, Inverse Fourier transform, Fresnel transform, Inverse Fresnel transform and angular spectrum propagation.

Preferably, the hologram or the kinoform is generated by superposing the wavefront compensation with the wavefront propagated by the test image.

The optical device manufacturing system provided by the present invention includes the optical measurement method.

Preferably, the optical device manufacturing system includes an optical device moving system, wherein the optical device moving system translates and/or rotates an optical device according to the imaging quality of the detected image information obtained by light passing through the device under test.

Preferably, the optical device manufacturing system includes an optical device processing system, wherein the optical device processing system processes the optical device according to the imaging quality of the detected image information obtained by light passing through the device under test.

Preferably, the optical device processing system includes a glue dispensing system and/or a curing system.

Compared with the prior art, the present invention has the following advantages:

1. In the present invention, any wavefront can be generated by means of the spatial modulator of the image generation system, and any lens or optical surface can be simulated.

2. A whole lens (a plurality of lenses) can be measured, and unassembled lens elements in the lenses can be simulated, and in the assembling process, a function of judging whether the lens element is assembled correctly is achieved.

3. When the present invention is applied to lenses assembling, on the one hand, any wavefront can be simulated to measure and adjust the position in the assembling process, and in particular, the assembled lenses can be simulated directly to achieve a final imaging effect by simulating and compensating the unassembled lens element. On the other hand, the problems found in the assembling process can be analyzed to obtain probable reasons (for example, the assembled lens element has defects such as improper face types and refractive index errors) causing the problem according to the aberration condition, such that the assembling process stops for correction based on the problem feedback, thereby preventing a subsequent fine lens element from being assembled to the lens with problems, and further, improving the yield rate and reducing the defect rate.

BRIEF DESCRIPTION OF THE DRAWINGS

By reading and referring to detailed descriptions made by the following drawings with regard to non-restrictive embodiments, other features, purposes and advantages of the present invention will become more obvious.

FIGURE is a block diagram showing the frame structure of the optical measurement system provided by the present invention.

In the FIGURE:
Image generation system 1
Beam coupling device 2
Light source 3
Image measurement system 4

DETAILED DESCRIPTION OF THE EMBODIMENTS

The present invention is described in detail with reference to the particular embodiments below. The following particular embodiments will be conducive to further understanding of those skilled in the art on the present invention, but are not intended to limit the present invention in any form. It should be noted that variations and improvements still can be made by those skilled in the art without departing the concept of the present invention. All of these fall within the scope of protection of the present invention.

The image generation system adopts the phase-only modulation spatial light modulator with liquid crystal on silicon and a 520 nm laser device;

the device under test is an optical lens;

the image measurement system uses a CCD image sensor; and the control system uses a Personal Computer(PC) and a Field Programmable Gate Array (FPGA) or Application Specific Integrated Circuit (ASIC) chip.

During use, an optical lens under test is put in a light path, the spatial light modulator generates test image information (for example, an MTF line pair test diagram, a division pattern and etc.), and the control system can convert the test image information into hologram or kinoform information (detected image information) by calculation and output the information to the spatial light modulator. After a laser light source illuminates the spatial light modulator, the spatial light modulator outputs light containing the test image information to the optical lens under test. Light passes through the optical lens under test and then forms images (MIT line pair, division and the like) on the CCD image sensor to obtain the detected image information.

The control system reads the detected image information on the CCD image sensor, and obtains the aberration parameter according to the imaging quality by using an algorithm and judges whether the aberration parameter meets the judging standard (for example, the designed specification of the optical lens or the iterative number of measurement) or not. If yes, the control system outputs the measurement result (the own parameter and the aberration parameter of the optical lens, or qualification or disqualification and etc.) directly.

If not, by using the currently estimated aberration parameter, a new compensation phase distribution is generated according to the Zernike or seidal polynomial and is superposed to the current test image information for compensation. The result is output to the spatial light modulator after calculation, and then the spatial light modulator generates the compensated test image information, such that the light source illuminates the spatial light modulator to output the light containing the compensated test image information to the device under test. The CCD image sensor detects the light from device under test again, and the control system obtains a new estimated aberration parameter and judges whether the aberration parameter meets the judging standard or not again. Loop iteration is performed like this till the judging standard is met. Finally, the control system outputs the measurement result of the measured optical lens, wherein the measurement result includes parameters such as an optical parameter of the aberration parameter of the device under test.

The judging standard in the steps can simply test whether the device under test is qualified or not without giving other parameters. The flow will be finished regardless of whether the device is qualified or not, and the measurement system proceeds with new device measurement.

In the process, the judging standard can be one or more optical parameters, for example, MTF, MTF in various fields, focal length and the like. When there is an aberration in the optical lenses, the initial test image information (for example, back and white line pair is used) cannot meet the requirement of MTF. The control system can analyze whether the MTF request is met or not according to the detected image information and judge the aberration condition according to the detected image condition, so as to give the aberration parameter. For example, it is found from the detected image information processed by an algorithm that the image line pair in the X direction is relatively clear that in the Y direction is fuzzy, which indicates there is an aberration suspected to be astigmatism. In this case, the aberration can be compensated according to the zernike polynomial, a new phase distribution is generated and is superposed to an original test image (for example, every point of the kinoform of the original test image on the spatial light modulator are multiplied by $e^{j2\pi sy^2}$, wherein s is a coefficient which is related to the incident wavelength, the pixel pitch of the spatial light modulator, the astigmatism itself and the like, and y is a coordinate) and a new test image is generated. After the test image is shot again, the detected image is compared with the previously detected image or the multiple previously detected images to analyze the aberration change (worse or better), the aberration parameter is calculated again and is outputted, and such loop iteration is performed till the line pairs in the X and Y directions in the detected image do not have detectable definition difference or the judging standard for MTF can be met in the two directions. At the time, it can be judged that the system does not have astigmatism after a corresponding astigmatism coefficient is added to compensate astigmatism, so that a quantitative numerical value with astigmatism and aberration in the optical lens under test can be outputted. Surely, there are other aberrations in the lens simultaneously, for example, spherical aberration, coma and the like, and at the moment, the aberrations can be corrected and outputted one by one as required according to the above steps. Surely, a method of enumerating (exhaustion) of all conventional aberrations can be further adopted to change the aberration parameters one by one, and whether the measured aberration in the optical lens and quantitative analysis thereof or not is judged according to image quality analyzed from the detected image.

In the specific embodiment, the general parameters of the device under test can be given, and the control system generates an initial test image according to related parameters, such that the number of times of iterations can be reduced.

The test image can be generated according to a method as follows: 1, selecting a proper target test image (for example, the line pair, cross chart of different fields of view and the like); 2, virtually arranging the target image at a certain distance (for example, at infinity) behind the spatial light modulator and adding a certain phase distribution (for example, a random phase initially) as needed, calculating light field distribution (in the case of propagation at infinity, Fourier transform/Inverse Fourier transform can be used, and in the case of propagation at a certain distance, Fresnel transform or angular frequency propagation can be used for calculation) when the image is propagated to the spatial light modulator; and 3, superposing a needed compensation parameter (the compensation parameter can be generated according to the zernike polynomial and parameters of the polynomial can be obtained by software such as Zemax Optical Design Software for compensating the aberration and/or simulating a specific optical device) on the plane where the spatial light modulator is arranged to the light field distribution (dot product of phases is equivalent to addition of complex exponentials) generated in the step 2.

Another calculation method of the test image includes the steps of acquiring the wavefront input to the surface of the device under test and/or the optical wavefront output by the device under test during design (for example, acquiring from a design file of optical design software such as Zemax Optical Design Software) and performing back propagation/reverse propagation on the optical wavefront to the spatial light modulator by employing Fourier transform/Inverse Fourier Transform, wherein propagation at a certain distance can be calculated by way of employing Fresnel transform or angular frequency propagation (or the spatial light modulator can be directly arranged on the surface of the acquired optical wavefront without being propagated or the corresponding zernike coefficient rather than the optical wavefront is read by software such as Zemax Optical Design Software), so that light field distribution/hologram needed to be simulated on the spatial light modulator is obtained.

The method further includes step 4 after step 3 or after acquiring the light field distribution on the surface of the spatial light modulator according to the type of the spatial light modulator to output the actual hologram/the kinoform modulated by the spatial light modulator. Step 4 is a step of discretizing the light field distribution obtained by calculation. For example, when a phase-only modulation spatial light modulator is used, the intensity information of the light field distribution can be excluded, the phase information is discretized and output, and phase distribution can be optimized by methods such as iteration(for example, the intensity distribution is uniform), so that errors and noises generated in intensity abandoning and phase discretizing processes are reduced. When multiple spatial light modulators are used, one of the spatial light modulators can modulate the intensity and the other one of the spatial light modulators modulates phase (the step 2 can be canceled at the time because the image is actually displayed in a specific position by the intensity spatial light modulator without calculating propagation thereof); or both the two spatial light modulators modulate phase, and the intensity and phase are restored by a double phase modulation method, so that intensity is considered to realize a better image quality.

In the embodiment, other optical devices can be included, for example, a beam splitter couples a beam into the light path, and other lenses collimate light emitted by the light source or modulate light output by the spatial modulator (for example, divergence angle is zoomed in or out).

The light source in the embodiment further can add other wavebands, for example, 450 nm blue light and 650 nm red light laser devices are used. the light thereof is coupled into the light path through the coupling device (for example, an X cube prism, a dichroic beam splitter, an optical fiber and the like), the equipment can measure corresponding parameters of the device under test in cases of different wavelength simultaneously so as to obtain parameters such as a chromatic aberration.

The equipment can be further used in the assembling process of the optical device. For example, in the lens assembling process with five lens elements, after the first and second lens elements are glued, the control system simulates an ideal light field modulated by the subsequently unassembled lens element according to the design file in the equipment, and the light field is outputted to the two assembled lens elements and then the test image is outputted to the detection system so as to judge whether the assembled lens element/lens element groups meets the requirement or not, specifically, whether each lens element is qualified or not and has problems in assembly or not (problems such as decentering and uneven thickness of glue layers). Detection is performed every time one or several lens are assembled successively. When problems are detected, the assembling process can be corrected or terminated immediately rather than the defect detection can be performed only when all lens elements are assembled. In this way, the yield rate can be improved and the loss in the assembling process can be reduced. By taking correction and adjustment of the position of the assembled lens element as an example, the lens element is measured every time the position of the lens element is adjusted, and iteration is performed like this. In each iterative process, the detected image information can be either invariable or variable to improve the measurement precision.

In addition, under some circumstances (for example, the parameters of the device under test are unknown), the spatial light modulator can hardly test and correct the aberrations under all parameters of the lenses (or lenses with all lens elements) by means of one wavefront distribution. At the time, a plurality of holograms can be used (various wavefront distributions), and each hologram corresponds to part of the parameter range of the lens under test, and therefore, better test and correction are implemented by way of separate output in time. For example, for different fields of view (for example, the full field range is −50 to 50 degrees), MTF parameters are generally different. In this case, the aberration of a center field of view (range from −5 to 5 degrees) is tested and compensated first, i.e., the generated hologram (wavefront) only contains an image of the center field of view and correction and test are performed. After test and correction of the center field of view are finished, test and correction are then performed on a next stage field of view (for example, −10 to −5 degrees, 5 and 10 degrees) and consecutively repeated until test and correction on ranges of all fields of view are finished.

In actual use, if a spatial space-bandwidth product (Lagrange invariant) of the spatial light modulator is mismatched with the device under test, and the spatial space-bandwidth product of the spatial light modulator is smaller than the device under test, then the simulated optical wavefront cannot cover all image heights or fields of view used by the device under test. However, it is expensive to design the spatial light modulator again.

In order to solve the problem, the system is designed to test part of a field of view or an image height area of the device under test only, for example, the field of view used for designing the device under test is −30 to 30 degrees, so that the spatial light modulator simulates the optical wavefront input by the 0-30 degree field of view only. As many optical devices are of symmetry, this method will not affect the actual test result. In the other way, a rotatable or movable system can be designed to be mounted on a clamp that clamps the device under test, such that the device under test is rotated or moved. For example, the device under test is rotated at 180 degrees to obtain a measuring result of −30-0 degree field of view.

In addition, another method for solving the problem that the space-bandwidth product of the existing spatial light modulator is smaller than the device under test is to splice the field of view or image height by employing multiple spatial light modulators or multiple sets of spatial light modulator systems, such that a greater space-bandwidth product is implemented. For example, the two spatial light modulators are placed in parallel and are illuminated by using one or more light sources simultaneously or separately, such that the space-bandwidth product which is two times of that of the single spatial light modulator can be implemented.

In addition, a temperature control and/or humidity control system can be further added to the equipment, such that the reliability, the stability and the applicability of the equipment are improved.

In addition, a system capable of machining the device under test can be further added to the equipment, such that the equipment becomes an instrument integrating machining and measurement. For example, a rotating and/or blowing part is added to a mechanism that clamps the device under test, and another lens element to be assembled is mounted automatically in the lens, so that the control system controls the lens element to move according to information such as aberration. Moreover, the system includes components for glue dispensation, ultraviolet exposure and the like. Glue is dispensed first, and then the device is moved to a proper position to expose and cure the part, so that the lens elements are laminated.

Those skilled in the art shall know that except in form of a pure way of a computer readable program code to implement the system, device and modules thereof provided by the present invention, the system, device and modules thereof provided by the present invention can implement the same program in form of a logic gate, a switch, an application-specific integrated circuit, a programmable logic controller, an embedded microcontroller and the like fully by logically programming the method steps. Therefore, the system, device and modules thereof provided by the present invention are considered a hardware part and modules of various programs included therein are also considered structures in the hardware part. Modules for implementing various functions can be also considered software programs that implement the method and the structures in the hardware part.

The particular embodiments of the present invention are described above. It is needed to understand that the present invention is not limited to the specific embodiments, and those skilled in the art can make various variations or modifications within the scope of the claims without affecting the substantial contents of the present invention. In the absence of conflict, the embodiments of the application and features in the embodiments can be combined with one another arbitrarily.

The invention claimed is:

1. An optical measurement system, comprising:
an image generation system configured for generating test image information, adding wavefront compensation into the test image information and outputting light containing the test image information to a device under test, wherein an assembled spatial position of an optical device in the device under test is measured and adjusted by simulating the wavefront, or the wavefront compensation is configured for compensating a missing optical part in the device under test;
an image measurement system configured for obtaining detected image information according to the light passing through the device under test; and
a control system configured for calculating and/or selecting the test image information and outputting the test image information to the image generation system.

2. The optical measurement system according to claim 1, wherein the control system obtains an aberration parameter according to imaging quality of the detected image information.

3. The optical measurement system according to claim 2, wherein the control system comprises:
a standard judging system configured for judging whether a parameter measured meets a judging standard or not; outputting a measurement result if the parameter measured meets the judging standard; and if the parameter measured does not meet the judging standard, obtaining a compensation parameter according to a current aberration parameter and superposing the compensation parameter to current test image information for compensation, wherein the image generation system generates compensated test image information.

4. The optical measurement system according to claim 3, wherein the measurement result comprises any one or more of parameters comprising MIT in a same field of view, MTFs in different fields of view, the aberration parameter, a chromatic aberration parameter and a focal length.

5. The optical measurement system according to claim 1, wherein the test image information comprises a hologram or a kinoform of a modulated wavefront.

6. The optical measurement system according to claim 5, wherein the image generation system separately generates the test image information for setting wavefront modulation, different parts corresponding to a target image height of the device under test and/or different parts of a target field of view; and the test image information is output for many times successively in form of different parameters and/or target objects.

7. The optical measurement system according to claim 1, wherein the test image information accounts for all or part of a target image height of the device under test; and/or the test image information accounts for all or part of a target field of view of the device under test.

8. The optical measurement system according to claim 1, wherein the image generation system comprises at least one spatial light modulator, and the at least one spatial light modulator comprises a phase spatial light modulator and/or an intensity spatial light modulator.

9. The optical measurement system according to claim 1, wherein the image generation system comprises any one or more of optical components comprising a light source, a lens, an optical stop, a rotator, a wave plate, a polarizer and a prism.

10. The optical measurement system according to claim 1, wherein the control system obtains the test image information by a real-time calculation or reading according to an input image and/or wavefront information and outputs the test image information to the image generation system, wherein the image generation system generates the test image information physically to modulate a needed light wavefront and/or a needed light field.

11. The optical measurement system according to claim 10, wherein the control system performs the real-time calculation or reading according to a feedback of the image measurement system.

12. An optical device manufacturing system, comprising the optical measurement system of claim 1.

13. The optical device manufacturing system according to claim 12, comprising an optical device moving system, wherein the optical device moving system translates and/or rotates an optical device according to imaging quality of the detected image information obtained by the light passing through the device under test.

14. The optical device manufacturing system according to claim 13, comprising an optical device processing system, wherein the optical device processing system processes the optical device according to the imaging quality of the detected image information obtained by the light passing through the device under test.

15. The optical device manufacturing system according to claim 14, wherein the optical device processing system comprises a glue dispensing system and/or a curing system.

16. An optical measurement method, generating test image information and adding wavefront compensation into the test image information to compensate wavefront of a device under test and an image measurement system;
wherein an assembled spatial position of an optical device in the device under test is measured and adjusted by simulating the wavefront, or the wavefront compensation is configured for compensating a missing optical part in the device under test.

17. The optical measurement method according to claim 16, wherein the wavefront compensation is implemented by obtaining a wavefront and simulating the wavefront by using the image generation system, wherein the wavefront is set to be propagated to the surface of the device under test, an exit/entrance pupil of a system or an optical stop position of the system.

18. The optical measurement method according to claim 16, wherein the wavefront is calculated by reversely propagating the wavefront of an image to an exit/entrance pupil of the system, the optical stop position of a system or the image generation system.

19. The optical measurement method according to claim 16, wherein the wavefront compensation is calculated by adopting a Zernike polynomial and/or a Seidal polynomial.

20. The optical measurement method according to claim 16, wherein a hologram or a kinoform is generated by adding the wavefront for compensation to the wavefront of an image propagated by the test image information.

* * * * *